Nov. 28, 1967 F. E. JONES ET AL 3,354,544

METHOD AND APPARATUS FOR MAKING ELECTRICAL ELEMENTS

Filed July 31, 1964 2 Sheets-Sheet 1

INVENTORS
FRANK E. JONES
ALFRED B. CASTLE, SR.
BY Claude Funkhouser ATTORNEY
Harold W. Milton, Jr. AGENT United States Patent Office 3,354,544

Patented Nov. 28, 1967

3,354,544
METHOD AND APPARATUS FOR MAKING ELECTRICAL ELEMENTS

Frank E. Jones, Bethesda, Md., and Alfred B. Castle, Sr., Washington, D.C., assignors to the United States of America as represented by the Secretary of the Navy Filed July 31, 1964, Ser. No. 386,799
1 Claim. (Cl. 29—620)

ABSTRACT OF THE DISCLOSURE

A technique for making a resistor utilizing a magnetic mask machined flat on one edge, the mask being placed either directly onto a substrate plate or onto a layer of hydroscopic material plated onto the substrate, the mask being held in place by a magnet on the opposite side of the substrate, the thus assembled mask-substrate-magnet combination being disposed in a vacuum chamber where, by a process of either evaporation or sublimation, a conductive film is caused to be deposited either on the substrate or on the hydroscopic material to form electrodes on alternate sides of the mask.

The invention described herein may be manufactured and used by or for the Government of the United States of America for governmental purposes without the payment of any royalties thereon or therefor.

The present inventive concept relates generally to electric hygrometer elements and more particularly to apparatus and techniques utilized to make electric hygrometer elements incorporating particularly humidity-sensitive materials.

In the use of radiosondes for the measurement of meterological variables in the atmosphere there has been a continuing need for a satisfactory humidity-sensor. In the radiosonde the sensor is transported through the air at speeds of the order of a thousand feet per minute, and, consequently, it must respond rapidly to changes in humidity. Such a sensor is in existence and is the subject of the patent to Jones, 3,058,079 which issued on Oct. 9, 1962.

The patent to Jones sets forth an electric hygrometer having an electrically non-conducting surface with a pair of film electrodes disposed on this surface and humidity-sensitive material disposed as film in the space between the electrodes and in electrical contact with the electrodes. The hygrometer as disclosed in the Jones patent works very satisfactorily; however, known manufacturing techniques degrade its perfection. When the hygrometer is manufactured by a chemical or etching process the moisture absorbent surface between the electrodes is often contaminated so as to adversely effect a change in the absorbent qualities of the surface to affect the surface resistance and therefore provide an imperfect sensor. Also, in the manufacture of the hygrometer, a film of electrode material is disposed either directly on the glass substrate with a film of resistance material over the electrode material, or with the film of resistance material directly on the glass substrate with the electrode material on top of the resistance material. In either disposition it is important for the edges of the electrodes to be sharp and abrupt; that is to say, a film of electrode material on a glass substrate should have sharp, flat edges, which are perpendicular to the substrate, defining its limits rather than edges resulting from a gradual build up of the thickness of the film.

Often in the manufacture of electric hygrometer elements, the film forming either the electrodes or the resistor is deposited on the substrate element while the substrate is in an evaporation chamber. In such an environment, the substrate surface to be coated with the film should be inverted to prevent splashing of drops of the metallic material which has been evaporated and fall within the chamber.

The problems incurred in the manufacture of hygrometer elements lead to the invention of a magnetic mask which can be used during the film depositing process by being held against the glass substrate to divide the film to be utilized as electrodes. The use of the metallic mask held to the glass substrate by a magnet alleviates the contamination problem that exists in the etching or chemical method of making a hygrometer element and, also, sharply defines the edges of the film on the substrate, as well as, allowing the glass substrate to be manuevered about freely within an evaporation chamber.

It is therefore the general purpose of the inventive concept herein described to provide a technique for making electrical components which technique utilizes all of the advantages of the prior art techniques and additionally possesses the capability of producing electrical elements of a greater degree of perfection. To attain the desired results, the present inventive concept contemplates a unique arrangement of the components to provide a device utilized to make a mask made of magnetic material, a process for making the mask, and a process utilizing a magnetic mask for the manufacture of electrical elements having a film of conductive material thereon.

Accordingly, it is an object of the present invention to provide a method of manufacturing electrical components having a conductive film.

Another object of the present invention is to provide a method of manufacturing hygrometer elements which have capabilities not known in hygrometer elements of the prior art.

A further object of the present invention is to provide an apparatus utilizable to make a mask of magnetic material to be used in the manufacture of electrical elements.

Still another object is to provide a method of making a magnetic mask.

Yet another object is to set forth a new and novel method for the manufacture of electrical elements in which a mask, used to separate the electrodes disposed on a glass substrate or on a film of resistance material, is held in place against the glass substrate or on the resistance film by a magnet placed against the reverse side of the glass substrate.

Other objects and many of the attendant advantages of this invention will be readily appreciated as the same becomes better understood by reference to the following detailed description when considered in connection with the accompanying drawings wherein.

Figure 1:
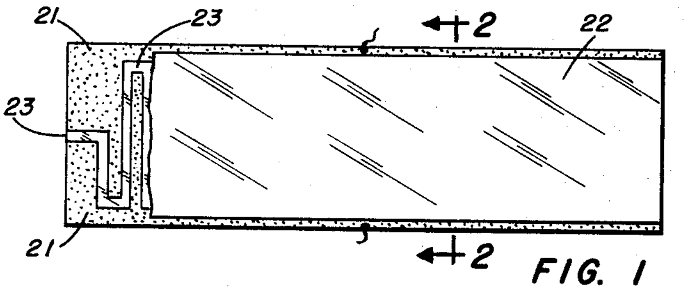
FIG. 1 shows a plan view of an electrical component as made in accordance with the teachings of the instant invention and is illustrative of a preferred embodiment thereof, shown with a portion of the components broken away.
Figure 2:
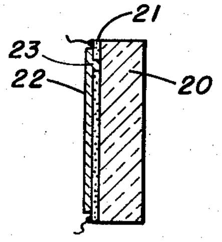
FIG. 2 shows a sectional view taken along line 2—2 of FIG. 1.

Referring now to the drawings, there is illustrated in FIGS. 1 through 4 a hygrometer element. The hygrometer element of FIGS. 1 through 4 is more particularly defined in the above mentioned patent to Jones, however, since the instant invention is concerned with the manufacture of such an electrical element, the hygrometers illustrated in FIGS. 1 through 4 are broadly described herein.

The hygrometer of FIG. 1 comprises a base or substrate member 20 which may be made of glass, quartz, polystyrene or similar plastics, or other electrically insulating materials. Disposed upon substrate 20 are conducting elements or electrodes 21. The electrodes 21 can be of any number of conducting materials such as metals, alloys of metals, solid solutions or combinations of metals. Also, the electrodes 21 can be in a variety of forms so long as there is a separation between them. A common way of depositing the electrodes 21 upon the substrate 20 is by evaporation. Once the electrodes 21 are on the substrate 20, a humidity-sensitive material or resistance material 22 is deposited on the substrate and electrodes so as to fill in the space 23 between the electrodes 21. Since the resistance material 22 absorbs moisture, the passage of current from one electrode 21 to the other through the resistance material 22 is a function of the moisture in the environment in which the element is disposed.

Figure 3:
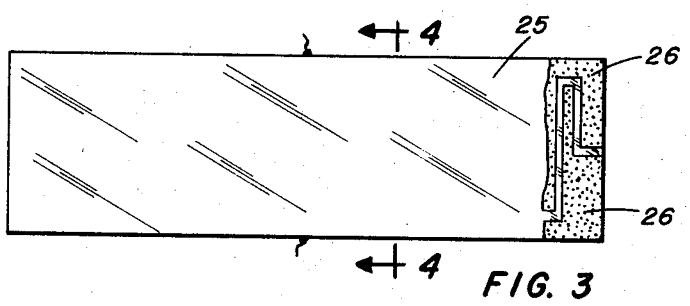
FIG. 3 shows a plan view of a modification of the component of FIG. 1 with a portion thereof broken away.
Figure 4:
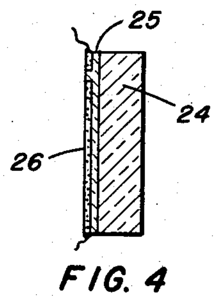
FIG. 4 shows a sectional view taken along line 4—4 of FIG. 3.

In the modification of the hygrometer element shown in FIGS. 3 and 4, electrodes 26 are placed over the humidity-sensitive layer or resistance material 25 which in turn covers surface of the substrate 24. The performance of the two electrical elements illustrated in FIGS. 1 through 4 is dependent upon the surface "attachments" or adsorption of molecules of water vapor to the humidity-sensitive or resistance material and if the surface of the humidity-sensitive material is not pure and uncontaminated this adsorption is affected and the perfection of the element is decreased. Furthermore, the performance of the illustrated electrical devices is dependent upon the sharp delineation of the separation between the electrodes. In some manufacturing processes, as in some etching processes, the edge of the electrode material is thin and gradually gets thicker as the distance increases from the edge of the electrode. It is one of the significant features of the instant inventive concept that the edge or line of demarcation at which the electrode comes in contact with either the resistance material or the substrate is sharp and the electrode extends upward at a 90° angle from the surface of the substrate or the resistance material, as the case may be.

Figure 5:
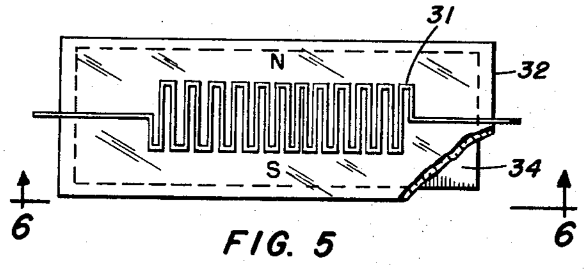
FIG. 5 shows a plan view of a substrate which is to be coated with conductive materials, resting on a magnet and with the further showing of a mask resting upon the substrate.
Figure 6:
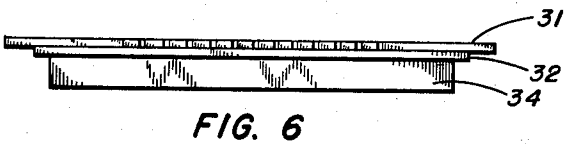
FIG. 6 is a cross-sectional view taken along line 6—6 of FIG. 5.
Figure 7:
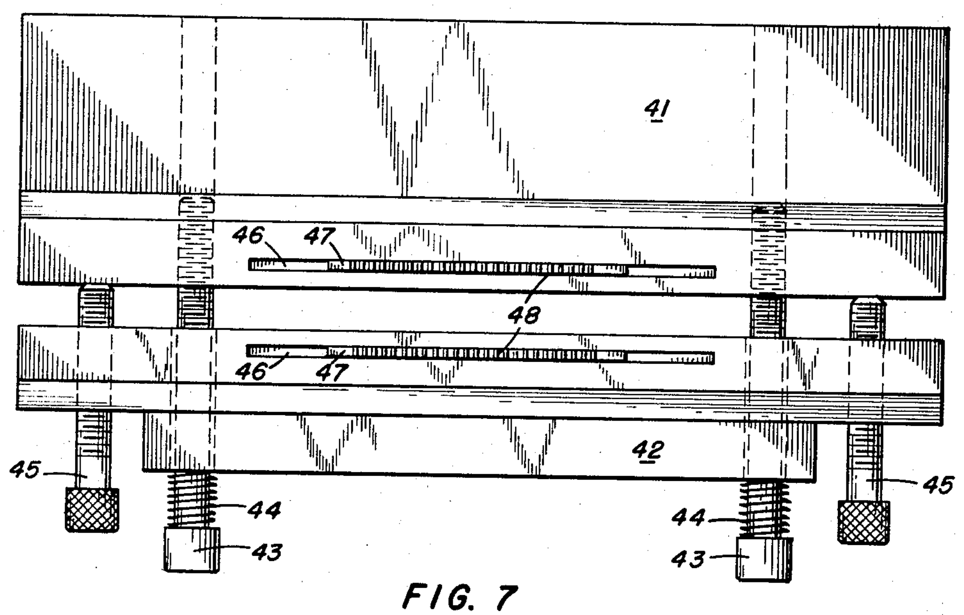
FIG. 7 is a plan view of an apparatus illustrative of that used to make a mask.
Figure 8:
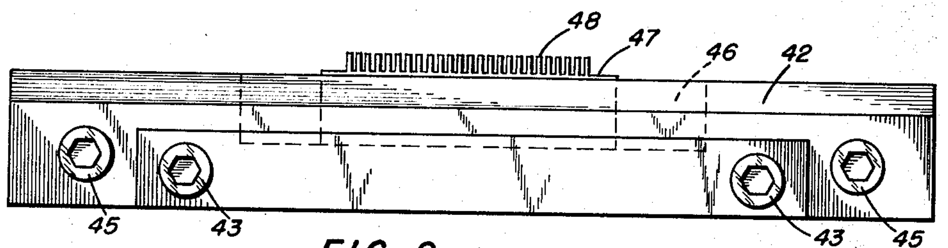
FIG. 8 is an elevational view of the apparatus of FIG. 7.

The present invention contemplates the use of a mask held against the substrate or resistance material, whichever may be the case, to delineate the separation between the electrodes and to provide sharp edges for the electrodes. The disposition of such a mask upon a glass substrate is illustrated in FIGS. 5 and 6 wherein there is disclosed a mask 31 resting upon a substrate 32. The substrate 32 in turn rests upon a magnet 34. The magnet is divided longitudinally delineating the north and south poles; that is to say, the north pole is on one side of the longitudinal axis and the south pole is on the other side of the longitudinal axis, as is illustrated in FIG. 5. The mask 31 illustrated in FIG. 5 is composed of a series of interconnected 180° loops, or, described another way, S-shaped segments attached end to end. It is necessary to dispose all of the loops or curves of the S's of the mask along one pole of the magnet to prevent an uneven distribution of the magnetic lines of force along the length of the mask, which uneven distribution would distort the mask. That is to say, in the event the magnet has a north pole at one end and a south pole at the other, the forces at either end holding the mask against the substrate are of a different magnitude than the forces in the middle of the mask and, therefore, the spacing between the adjacent loops of the mask is different along its length. The mask 31 is made of a strip of magnetic material which has been machined along one edge so that after the mask 31 has been made the edge or face of the mask which is against the glass substrate 32 is smooth thereby to be in complete contact with the substrate 32.

After the selection of a strip of material from which a mask is to be fabricated has been made, and one edge of the strip has been machined smooth, a mask may be made in accordance with any desired configuration by weaving the strip of material upon a tension applying apparatus which places the strip in tension, and, thereafter, smoothing the sides of the strip before removing it from the tension applying apparatus.

Figure 9:
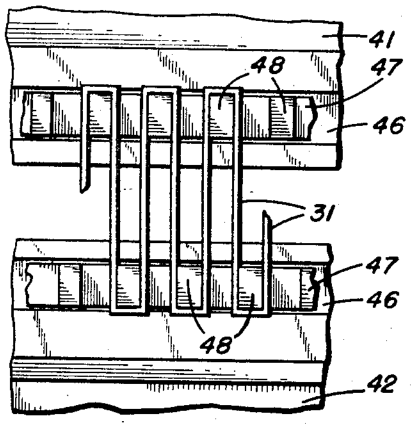
FIG. 9 is an enlarged partial plan view of the apparatus illustrated in FIG. 7 with a strip of material disposed thereon to form a mask.
Figure 10:
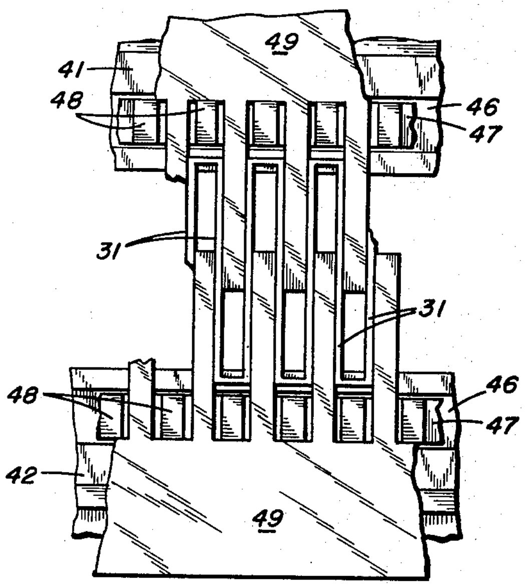
FIG. 10 is an enlarged partial plan view of the apparatus illustrated in FIG. 7 as a finished mask is being removed from the apparatus.

Such a tension applying apparatus used to fabricate a mask, as illustrated in FIG. 6, is shown in FIGS. 7 through 10. The tension applying apparatus illustrated is comprised of two adjacent adjustment members 41 and 42 which are secured together by bolts 43 extending through adjustment member 42 and threadedly engaging the adjustment member 41. Adjustment member 42 rides freely on the bolts 43 and is biased towards adjustment member 41 by springs 44. The relative distance between the adjustment members 41 and 42 is determined by operation of the adjusting screws 45 which are threadedly engaged with the adjustment member 42 and abut against adjustment member 41. Each of the adjustment members 41 and 42 have slots 46 therein which receive teeth plates 47. The plates 47 have disposed along one edge a plurality of teeth 48. Also as a part of the apparatus is a pair of combs 49, which combs are illustrated in FIG. 10. The combs 49 are used to smooth the sides of the mask and are inserted at right angles to the teeth 48 of the plate 47 so as to intermesh with one another.

In the operation of the tension applying apparatus, a strip of material which has been machined along one edge is woven onto the teeth 48 of the respective adjustment members 41 and 42 as illustrated in FIG. 9, wherein the strip is shown woven on the teeth 48 of plates 47. The adjusting screws 45 are then utilized to separate the adjustment member 41 from the adjustment member 42 to place the strip in tension to form the mask 31. The combs 49 are then inserted between the teeth 48 of the respective plates 47 to smooth the sides of the strip extending between the two rows of teeth 48 and, if the distance between the plates 47 is sufficient, functions to form or mold the strip as it passes around the individual teeth 48. Once this is accomplished the combs 49 intermesh.

To remove the mask from the apparatus, the tension is removed by moving the adjustment members 41 and 42 closer together by operation of the adjusting screws 45, the combs 49 are pulled a slight distance away from the loops of the mask, if necessary, and the adjustment members 41 and 42 are positioned so that the rows of teeth 48 may be inserted between the outside of the loops and the roots of the teeth on the combs 49, as shown in FIG. 10. The screws 45 are then utilized to move the adjustment members 41 and 42 apart so that the rows of teeth 48 pull the intermeshing combs 49 apart to allow the mask to fall free of the combs.

The finished mask is then placed upon the substrate, or the resistance film already upon the substrate, as illustrated in FIG. 5, with the magnet placed on the opposite side of the substrate to hold the mask against the substrate. The mask-substrate-magnet combination is then placed into an environment whereby the surface of the substrate, not covered by the mask is coated, as for example, in an evaporation chamber. The mask-substrate-magnet combination is very effective in accomplishing the desired result since they remain together as a unit and may be moved about with convenience in the plating environment.

As is apparent from the foregoing description, the present invention is directed to a method whereby a magnetic mask is utilized to manufacture an electrical element, which electrical element is of a degree of perfection not heretofore known in the prior art. Additionally, it is directed to the setting forth of a method and apparatus for making a mask to be utilized in such manufacture.

The invention has been described in an illustrative manner and it is to be understood that the terminology which has been used is intended to be in the nature of words of description rather than limitation.

Obviously many modifications and variations of the present invention are possible in the light of the above teachings. It is therefore to be understood that within the scope of the appended claim the invention may be practiced otherwise than as specifically described.

What is claimed is:

A method for making a resistor comprising the steps of:

machining an edge of a strip of magnetic material so as to make it flat, forming the strip into a mask having a series of interconnecting 180° loops whereby the width of the mask is defined by a line of loops on one side which are connected to a line of loops on the other side and one face of the mask is defined by the machined edge of the strip, completely plating the face of a substrate plate with a humidity-sensitive resistor film, placing the machined edge of the mask against the resistor film so as to isolate that part of the substrate plate on one side, of the strip forming the mask, from that part of the substrate plate on the other side, of the strip forming the mask, the ends of the strip extending beyond the opposite end of substrate plate, placing a permanent magnet on the opposite side of the substrate plate to the side having the surface of the resistor film with the north pole thereof evenly disposed opposite all of the loops on one side of the mask and its south pole evenly disposed opposite all of the loops on the opposite side of the mask to prevent adjacent loops of the mask from attracting each other and distorting the mask.

disposing the thus assembled mask-substrate-magnet combination in a vacuum chamber where, by a selected one of the processes of evaporation and sublimation, a conductive film is caused to be deposited on the resistor film adjacent the mask to form electrodes on alternate sides of the strip forming the mask, displacing the mask from the plated substrate whereby the resistance film, only, occupies the space left by the mask after displacement.

References Cited

UNITED STATES PATENTS

| | | | |
|---|---|---|---|
| 2,707,880 | 5/1955 | Wannamaker | 338—35 X |
| 2,976,188 | 3/1961 | Kohl | 117—38 |
| 3,002,847 | 10/1961 | Shaffer | 117—38 |
| 3,058,079 | 10/1962 | Jones | 338—35 |
| 3,077,774 | 2/1963 | McIlvaine | 338—35 X |
| 3,170,810 | 2/1965 | Kagan | 117—38 |

JOHN F. CAMPBELL, *Primary Examiner.*

J. L. CLINE, *Assistant Examiner.*